United States Patent [19]

Corbet

[11] Patent Number: 4,606,950
[45] Date of Patent: Aug. 19, 1986

[54] METHOD FOR ASSEMBLING A FLORAL ARRANGEMENT

[75] Inventor: Ellen M. Corbet, 265 Lakewood Cir., Burr Ridge, Ill. 60521

[73] Assignees: Ellen M. Corbet; Charles J. Trost, both of Burr Ridge, Ill.

[21] Appl. No.: 645,868

[22] Filed: Aug. 31, 1984

[51] Int. Cl.⁴ .......................... A01G 5/04; A47G 7/00
[52] U.S. Cl. ..................... 428/23; 47/41.12; 156/63; 248/27.8
[58] Field of Search .......... 428/23; 248/27.8; 47/41.12; 156/63

[56] References Cited

U.S. PATENT DOCUMENTS

| | | | |
|---|---|---|---|
| 2,981,033 | 4/1961 | Cheetwood | 47/41.12 |
| 3,261,126 | 7/1966 | Marks | 428/23 X |
| 3,424,641 | 1/1969 | Separa | 428/23 |
| 3,961,445 | 6/1976 | Rack | 428/23 X |
| 4,070,495 | 1/1978 | Berger et al. | 427/4 X |

FOREIGN PATENT DOCUMENTS 796703   1/1936   France ................................. 428/23

*Primary Examiner*—Henry F. Epstein
*Attorney, Agent, or Firm*—Mary R. Jankousky

[57] ABSTRACT

A method for assembling a floral arrangement is shown. An individual may choose from a number of bases, each resulting in a different floral arrangement design. Each base has a predetermined pattern of holes for insertion of flower stems which the individual chooses to produce a design having the desired details. Each hole is coded to be matched with a flower of a corresponding code. A group of flowers identified by the same code will have the same approximate size and shape, but may vary in color, material or type of flower to allow the individual to choose the arrangement details of the basic design.

13 Claims, 3 Drawing Figures

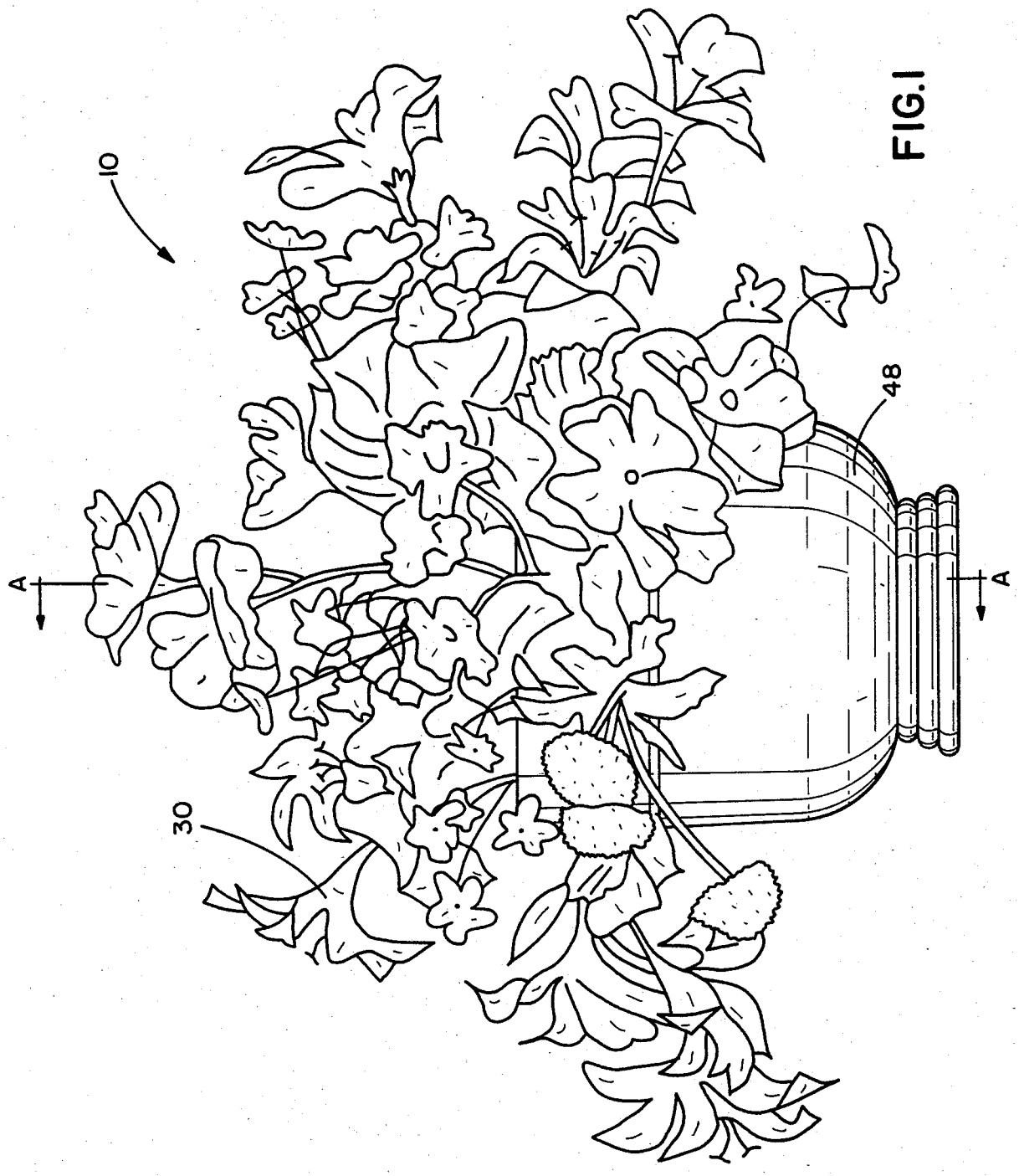

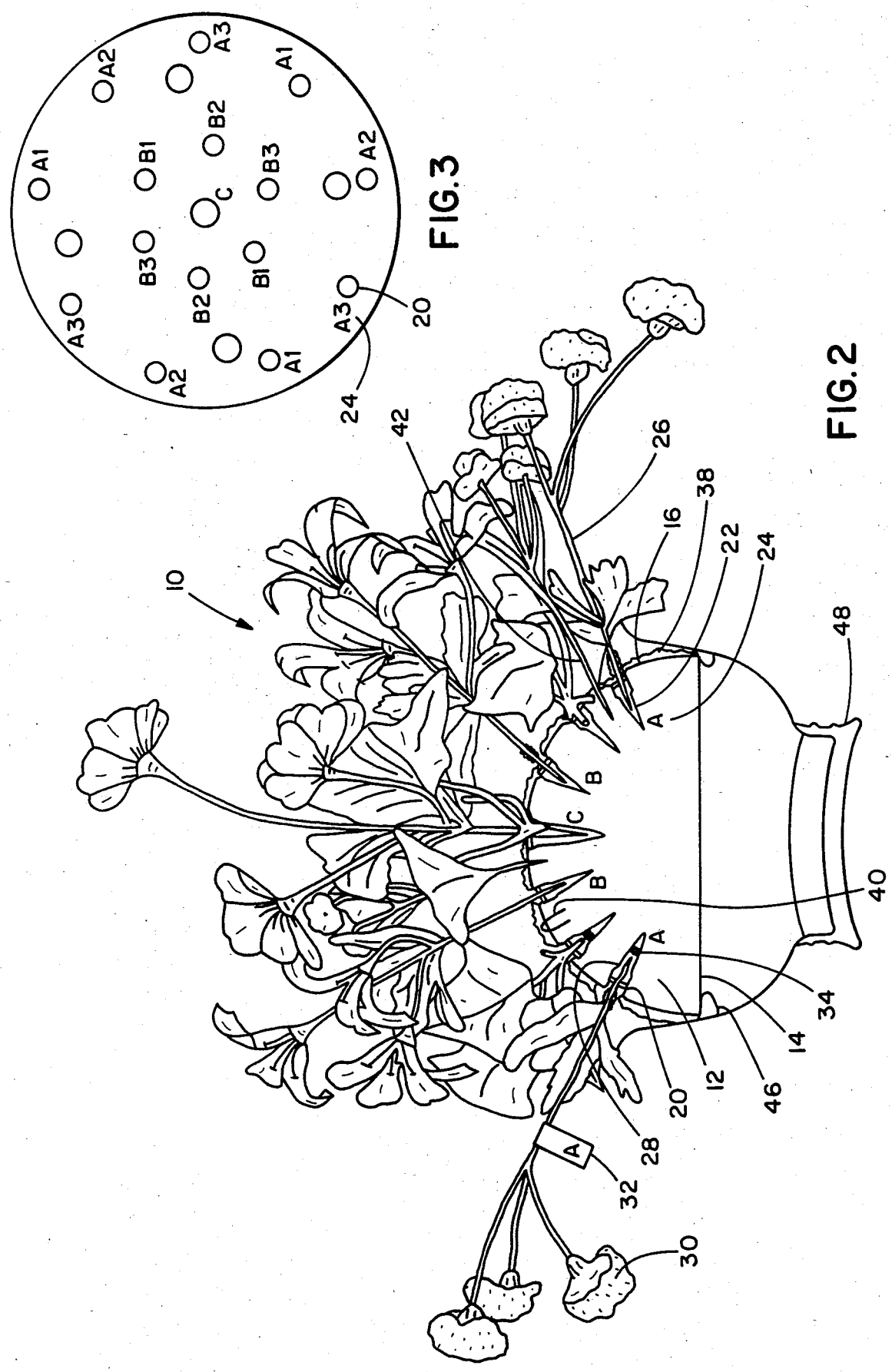

METHOD FOR ASSEMBLING A FLORAL ARRANGEMENT

FIELD OF THE INVENTION

This invention relates to a method for assembling a floral arrangement, and more particularly, to a method for producing a predesigned arrangement from components.

Individual flowers, leaves and other decorative stalks are presently available for insertion into a plastic foam base. Producing a floral arrangement from these individual flower stalks presents a problem for the average individual inexperienced in designing such floral arrangements. Without any assistance from professionals, the average individual's floral arrangement design will generally lack the pleasing aesthetics of a purchased arrangement.

An individual may alternatively purchase an assembled floral arrangement. However, the individual is denied both the opportunity to vary the color or shape of the arrangement and the satisfaction of assembling a decorative article.

There is a need for a method for assembling a floral arrangement which allows the individual some choice in the design details yet provides sufficient guidance to enable the individual to obtain an attractive result.

SUMMARY OF THE INVENTION

The present invention is an improved method for assembling a predesigned floral arrangement. The invention preferrably has a base with an upper surface having a predesigned pattern of holes at predetermined locations, angles and depths. Each hole is coded and adapted to receive an individual flower, green or other appropriate decorative stalk having a corresponding code. A number of bases are available. Each base has holes with different locations and codes to produce a different style of floral arrangement. The decorative stalk to be placed in a given hole may be chosen from a group of stalks having a variety of shapes and colors, each stalk being appropriately coded and pre-cut. Thus the person assembling the floral arrangement may choose the color and shape of the arrangement, yet is assured of producing a well-proportioned and atrractive floral arrangement.

The coded flower stalks may be sold separately or in a kit which includes a base, a decorative container, and other components of the floral arrangement as described below. Kits could be offered including decorative stalks of many color combinations to cater to the tastes of the individual assembler. The flowers used can be silk, fresh, dried or any other type suitable for the purpose intended by the individual. If the decorative stalks are offered for sale individually, instructions regarding balanced color schemes and flower selections will be provided to insure that the individual obtains a professional result.

It is an object of this invention to provide a method and apparatus for assembling a predesigned floral arrangement to accomodate individual tastes and needs.

It is a further object of this invention to provide a low-cost method for assembling a professionally designed floral arrangement to meet individual requirements.

The foregoing and other objects, features and advantages of this invention will be apparent from the following more particular description of a preferred embodiment thereof, as illustrated in the accompanying drawings and the claims.

BRIEF DESCRIPTION OF THE DRAWINGS

FIG. 1 is a perspective view of the preferred embodiment of a floral arrangement in accordance with the present invention.

FIG. 2 is a sectional view of the floral arrangement taken along the line A—A in FIG. 1.

FIG. 3 is a top view of the base with the flowers and the moss removed.

DESCRIPTION OF THE PREFERRED EMBODIMENT

Referring now to the drawings, and particularly to FIG. 2 thereof, the entire floral arrangement is indicated generally by the reference character 10. The preferred embodiment includes base 12 having a bottom surface 14 and an upper surface 16. As best seen in FIG. 3, the upper surface 16 includes a predesigned pattern of holes 20 adapted to receive the flowers or decorative stalks 26 as described below.

The individual assembling the floral arrangement will choose from a variety of bases 12, each having a different pattern of holes 20 and each resulting in a different predetermined design. The base 12 may be formed of wood, plastic, glass, metal, plastic foam or any other suitable material. Here the base 12 is formed of plastic foam. To insure that the angles and size of the holes 20 are not altered, a retainer 22 of a suitable material, such as plastic, is placed in each hole 20.

Each hole 20 or retainer 22 is marked with one of a number of code markings to indicate the proper type of flower 26 to be received within the hole 20 or retainer 22. The floral arrangement design may require that a group of holes 20 or retainers 22 be given the same code 24. Here the codes of the retainers 22 are identified by comparing the base to a reference drawing such as FIG. 3. Colors, dots or any other method of coding may also be used.

The proper type of flower or decorative stalk 26 to be placed within a given retainer 22 is predetermined by placing on each flower 26 a code corresponding to one of the codes of the retainer groups. Here, the flower code is indicated by a tag 32 which is placed on the flower 26 by the manufacturer and is to be removed after assembly of the floral arrangement.

Each flower group includes flowers or decorative stalks 26 of the same approximate shape and size, but of a variety of colors and materials. Each flower group includes at least two subsets. Each subset contains a number of identical flowers equal to the number of holes in each base hole group. An individual may choose a subset of flowers 26 having a particular color or other details, while still obtaining the intended design of the floral arrangement, which is determined by the hole pattern of the base chosen by the individual. By designing a number of arrangements which utilize the same basic shapes of flowers 26 in different hole positions on the bases 12, one may choose to create any of a multitude of designs in any of a number of color combinations from a relatively small number of available bases 12 and flower stalks 26.

The flowers 26 each have a decorative end 30 and a base end 28. The base end 28 of each flower 26 is placed within the hole 20 or retainer 22, if used. The flowers 26 are precut to the length dictated by the arrangement design and need not be trimmed by the individual. To provide a more stable arrangement, a small amount of adhesive 34 is placed on the base end 28 before inserting the base end 28 into the hole 20 or retainer 22. The adhesive 34 may be floral clay, glue, model cement or another suitable adhesive.

After a flower 26 has been placed into each hole 20 or retainer 22, the upper surface 26 is covered with a synthetic moss 38 or another appropriate material to disguise the upper surface 16, holes 20 and retainers 22. The moss 38 may be secured by u-shaped pins 40. When the base 12 is formed of plastic foam, filler flowers 42 may be inserted into the plastic foam between the rows of flowers 26.

A few small pieces of floral clay 46 are placed on the bottom surface 14 of base 12 and the entire base and attachments are inserted into a container 48, which may be a vase, bowl, basket or other desired receptacle. The entire base and means for securing the flowers is thus hidden to provide an attractive, professional quality floral arrangement. The floral arrangement may also be displayed by other means, such as a hand holding device used with wedding bouquets.

While the invention has particularly been shown and described with reference to a preferred embodiment, it will be understood by those skilled in the art that variations in form, construction and arrangement may be made therein without departing from the spirit and scope of the invention. All such inventions are intended to be covered in the appended claims.

I claim:

1. A predesigned arrangement of flowers, greens and other decorative stalks designed for easy assembly, said arrangement comprising:
    a solid base having a plurality of holes, at least some of said holes having a retainer therein, each of said holes having a mark identifying the hole as belonging to one of several groups, each of said holes being located in a predetermined position, at a predetermined angle, and to a predetermined depth; and
    a plurality of flowers, greens or other decorative stalks equal to the number of holes, each stalk having a mark corresponding to a mark of one of said base holes, each of said stalks having a base end secured within one of said base holes having a corresponding mark.

2. A predesigned arrangement as claimed in claim 1 wherein the base is formed of a pierceable material, and the arrangement also comprises a retainer fixed within each of said base holes, said retainer shaped and dimensioned to hold one of said stalks in a predetermined location, at a predetermined angle and at a predetermined depth in said base.

3. A predesigned arrangement as claimed in claim 2 wherein filler stalks are inserted directly into said base at locations where no holes exist.

4. A predesigned arrangement of decorative stalks comprising:
    a base having an upper surface with a plurality of holes, at least some of said holes having a retainer therein, each of said holes having a predetermined depth, angle and location, each of said holes belonging to one of a plurality of groups as identified by a particular code marking; and
    a plurality of decorative stalks, each having a base end inserted into one of said base holes, and each decorative stalk being marked with one of a plurality of group codes corresponding to said base hole code markings, each of said groups of stalks having a plurality of subsets of identical stalks the number of stalks in each subset being equal to or greater than the number of holes in each of said corresponding base hole groups, the stalk of a given subset varying in color or material from the stalk of another subset to provide for a variety of details of the predesigned arrangement upon the alternative insertion of the stalks of any given subsets into the corresponding groups of base holes.

5. A predesigned arrangement of decorative stalks as claimed in claim 4 wherein the base holes may form any one of a plurality of patterns, whereupon each base with a different hole pattern is used in assembling a different predesigned arrangement.

6. A predesigned arrangement as claimed in claim 1 wherein said arrangement also comprises an adhesive securing a base end in each base hole, wherein said arrangement may be displayed at any angle.

7. A predetermined arrangement as claimed in claim 1 wherein said arrangement also comprises a container surrounding a portion of said base.

8. A method for assembling a predesigned decorative stalk arrangement, said method comprising the steps of:
    preparing a plurality of holes in a base, said holes having a predetermined position, angle and depth:
    inserting into at last some of said holes a retainer;
    marking each base hole with one of a plurality of codes;
    marking a plurality of decorative stalks with a code corresponding to each code of the base holes, each of said stalks having a base end; and
    securing a base end of a decorative stalk having a given code in each base hole having a corresponding code, wherein said arrangement may be displayed at any angle.

9. A method for assembling a predesigned arrangement as claimed in claim 8 wherein the method additionally comprises applying an adhesive to the stalk base end before inserting the stalk base end into a base hole.

10. A method for assembling a predesigned arrangement as claimed in claim 8 wherein the method additionally comprises attaching the base to display means to provide for transporting or displaying the arrangement.

11. A method for assembling a predesigned arrangement as claimed in claim 8 wherein said stalks marked with a given code vary in color or material but having approximately the same size and shape and are greater in number than the number of base holes marked with the corresponding code, whereupon the color or material, but not the approximate size or shape of the predesigned arrangement may be varied by changing the stalks inserted into the base holes.

12. A method for assembling a predesigned arrangement as claimed in claim 11 wherein the base holes are prepared and marked in accordance with one of a number of set patterns, said marked base codes including only those codes marked on said stalks.

13. A method for assembling a predesigned arrangement as claimed in claim 11 wherein said marking of base holes is accomplished by inserting into each base hole a retainer indicating the desired code and each stalk base end is inserted into a retainer.

* * * * *